May 8, 1951   B. KNAUER   2,552,182
DIFFERENTIAL ACTUATOR
Filed Nov. 12, 1949   2 Sheets-Sheet 1
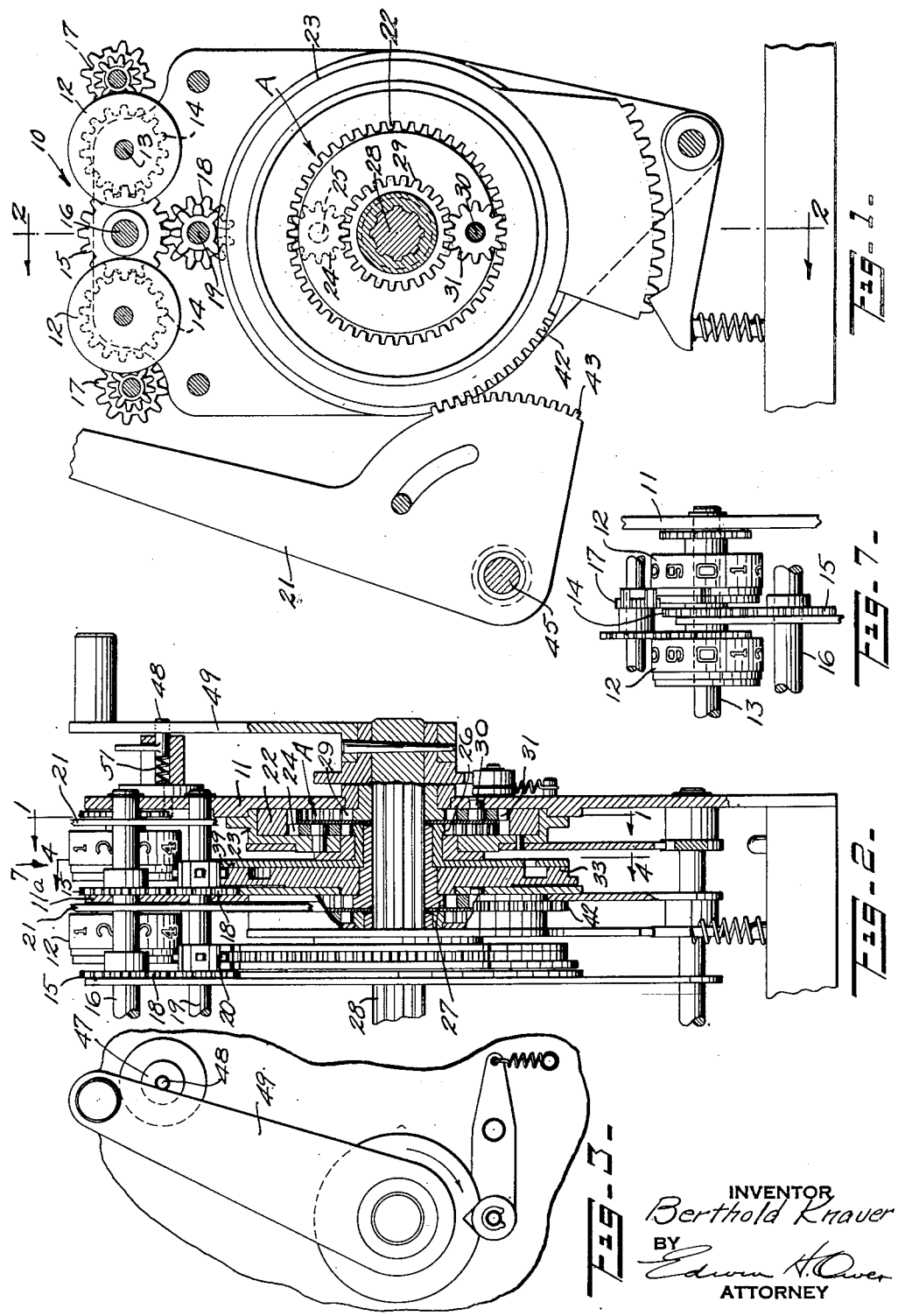
INVENTOR
Berthold Knauer
BY
Edwin H. Over
ATTORNEY May 8, 1951  B. KNAUER  2,552,182
DIFFERENTIAL ACTUATOR
Filed Nov. 12, 1949  2 Sheets-Sheet 2
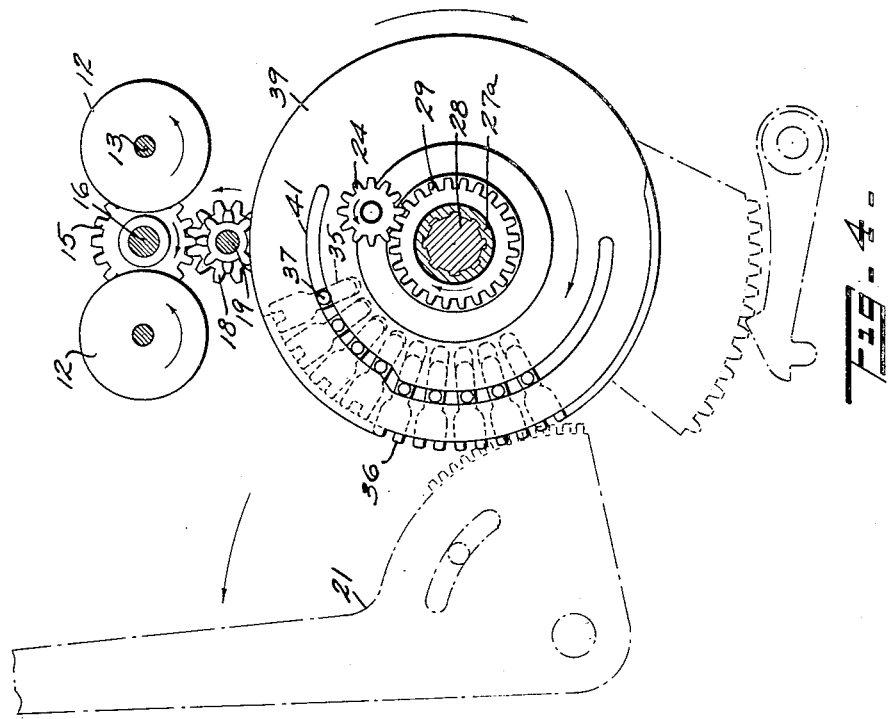
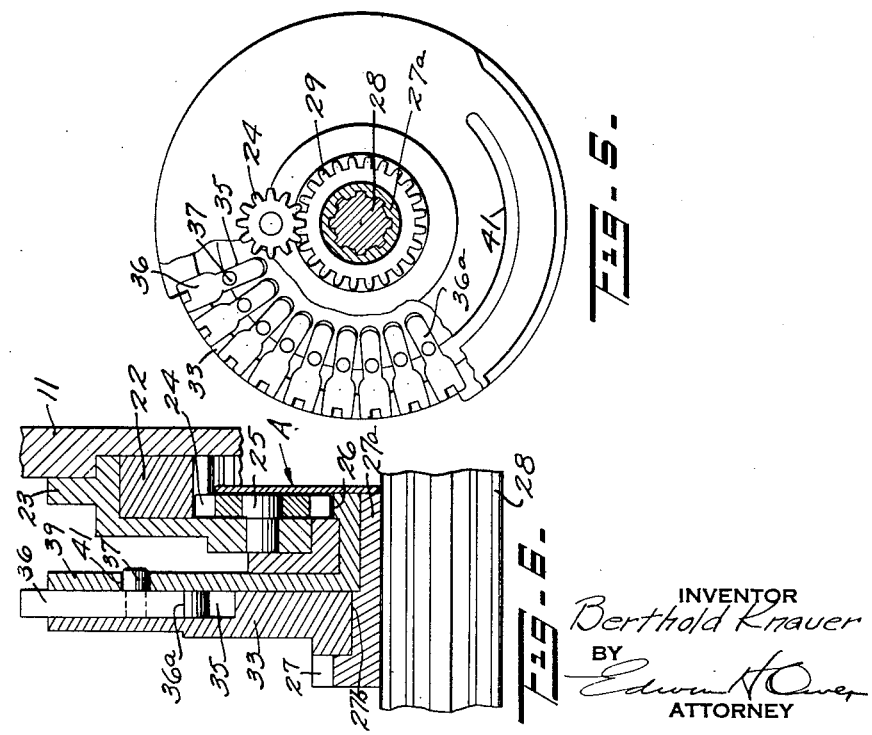
INVENTOR
Berthold Knauer
BY
Edwin H Oliver
ATTORNEY

UNITED STATES PATENT OFFICE

2,552,182

DIFFERENTIAL ACTUATOR

Berthold Knauer, East Norwalk, Conn., assignor to Pitney-Bowes, Inc., Stamford, Conn., a corporation of Delaware Application November 12, 1949, Serial No. 126,906

2 Claims. (Cl. 235—81)

This invention relates to a numeral wheel register actuating device.

It is the principal object of the present invention to combine differential mechanism with both value setting and cyclical drive portions of register actuating mechanism arranged on a cyclically driven shaft, in a manner which will permit the value setting elements to remain in constant operative setting relation with the actuator during an accumulating cycle of operation.

By way of example, one preferred embodiment of the invention is illustrated in the drawings, wherein:

Fig. 1 is a part elevation and part sectional view, taken substantially along the line 1—1 of Fig. 2, showing the differential control mechanism, and further includes a numeral wheel register unit and a value selecting element, all in operative relation;

Fig. 2 is a part sectional and part elevational view taken along the line 2—2 of Fig. 1;

Fig. 3 is a detail view showing a manual form of cyclical drive means;

Fig. 4 is a part elevational and part sectional view taken along the line 4—4 of Fig. 2, and showing a cam arrangement for the control of the setting of radially adjustable actuator teeth;

Fig. 5 is a detail view of the actuator shown in Fig. 4, and part of the cam structure removed to show the arrangement of the structural teeth;

Fig. 6 is an enlarged sectional view through a portion of the differential structure, and further includes a portion of the tooth supporting and adjusting structure, with a tooth shown in an actuating position; and Fig. 7 is a plan view of the numeral register wheels taken in the direction of the arrow 7, Fig. 2.

Referring to the drawings in detail, a registering or accumulating unit, indicated generally at 10, is supported between walls 11—11a, as best shown in Fig. 2. Said accumulating mechanism generally comprises numeral wheels 12, mounted on a shaft 13. Each numeral wheel 12 is preferably of known differential drive construction, such as the type illustrated in Patent 1,281,163, and each wheel has a drive gear 14 associated therewith which effects the drive of the differential therein.

In the structure shown in Fig. 1, two sets of numeral wheels 12—12 are shown, one set being adapted to register in an ascending order and the other in a descending order. Between pairs of numeral wheels of each order, an intermediate drive is provided, as indicated by the gear 15 meshing with the gears 14—14 in Fig. 1. Said gears 15 are carried by a shaft 16. A Geneva transfer pinion, indicated at 17, is also provided between each set of numeral wheels to effect tens transfer from the numeral wheel of lower order to the numeral wheel of higher order, as best shown in Fig. 7.

Associated with each numeral wheel intermediate drive gear 15 is a differentially controlled actuator, generally indicated at "A," Fig. 1, which actuator is adapted to control the drive of a further intermediate gear 18, meshing with the intermediate drive gear 15. The gears 18 are mounted on a shaft 19.

Each actuator unit "A" also has a value setting number 21 associated therewith which is arranged to adjust a desired number of teeth to an actuating position relative to teeth of a pinion 20, which pinion is fixed to the gear 18.

The actuator includes planetary differential mechanism comprising an internal ring gear 22, rotatively mounted within a shell 23, and is supported in the side wall 11 or 11a. A planetary pinion 24 is mounted on a pin 25, said pin being supported by the shell 23, and meshes with the teeth of the internal ring gear 22. Also meshing with said planetary pinion 24 is a sun gear 26, which gear rotates freely around an extended hub portion 27a of a sun gear member 27 associated with the actuator of next higher order. The sun gear 27 is fixed to a cyclically driven shaft 28. Another sun gear 29 is also fixed to said cyclically driven shaft 28, and is adapted to mesh with a second planetary pinion 31, which pinion is carried by a pin 30 fixed to the wall 11 or 11a. Said second planetary pinion 31 also meshes with the teeth of the internal ring gear 22.

From the description of the differential structure so far, it will be seen that the sun gear 26, planetary gear 24, and ring gear 22 will form one portion of the differential structure, which, as will be later described, is associated with value setting operations, and that the sun gear 29, planetary pinion 31, along with the ring gear 22 are associated with the driving cycle of differential operation, when the shaft 28 is rotated.

Referring now to the construction and operation of the toothed portion of the actuator, the same comprises a disc 33, fixed to the portion 27b, Fig. 6, of the sun gear 27, and is provided with radially positioned slots 35. Within each slot 35 is mounted a slidable two-toothed element 36, having a shank portion 36a engaging the slot. Each toothed element further has a pin 37 extending from one face thereof, which pins are adapted to engage a cam slot 41 in a cam disc 39. Said cam disc 39 is shown as an integral part of the hub portion of the sun gear 26 and therefor moves with the said sun gear.

The shell 23 has an external toothed segment portion 42, Fig. 1, which is adapted to be engaged by a toothed segment 43 formed on a setting lever 21. Said setting lever 21 is pivotally mounted upon a shaft 45, and when rocked about said shaft is adapted to rock the shell 23. Rocking of the shell 23 effects rotation of the planetary pinion 24, as it moves around the teeth of the internal ring gear 22, inasmuch as the ring gear is retained in a fixed position by the planetary pinion 31 during a value setting period. Rotation of the planetary pinion 24 causes the sun gear 26 to rotate, which in turn rotates the cam disc 39 to effect the projection of the desired number of toothed elements 36 to an actuating position.

After the setting of the toothed elements, the shaft 28 is adapted to be rotated through one complete revolution by a crank 49, whereupon the projected teeth of the toothed elements 36 will engage the teeth of the pinion 20 and drive the intermediate gear 18 to thus effect the drive of the register numeral wheels 12.

During the cycle of operation, the rotation of the splined shaft 28 effects rotation of the sun gear 29, which gear drives the planetary pinion 31 around its fixed pivot pin 30, to thus rotate the ring gear 22 and sun gear 26. The ratio between the sun gear 29 and pinion 31 is 2 to 1. The ratio between planetary pinion 29 and sun gear 26 is 1 to 2. Hence, the pinions 31 and 24 will be driven at twice the speed of the sun gear 29, and the sun gear 26 will move at the same relative speed and in the same direction as the sun gear 29. Therefore, the cam disc 39 will move about the hub 27a at the same speed as the actuator disc 33 which is fixed to the hub 27b.

Stop means is generally indicated at 47, Fig. 3, to limit each cycle of operation to 360°. Said stop means may be of any desired construction, but, for the purpose of illustration, comprises a horizontally slidable pin 48, normally urged to a stop position relative to the operating crank 49 by means of a spring 51.

Having described the invention what is claimed is:

1. In a register actuating device, a cyclically driven shaft, a bracket to support said shaft, a numeral wheel accumulator including a geared drive therefor, a rotatable actuator unit having settable teeth operatively associated with the geared drive and driven by said shaft, a differential unit supported on said shaft adjacent the actuator unit and including a shell having an internal gear freely supported therein, a planetary pinion supported by the shell and meshing with the internal gear, a planetary pinion carried by the shaft supporting bracket and meshing with the internal gear, an actuator tooth setting sun gear meshing with the first named planetary pinion and freely rotatable about the shaft axis, a cam associated with said settable teeth and connected with the sun gear, manually controlled means to effect adjustment of said shell, whereby the sun gear and cam may be rotated and a desired number of teeth may be placed in an accumulator actuator position, and a second sun gear fixed to the shaft and meshing with the second named planetary pinion, whereby, during a cycle of operation of said shaft the differential geared unit will effect control of the drive of the first named sun gear to provide the same relative speed of rotation as that of the cyclical drive.

2. In a register actuating device, a cyclically driven shaft, a bracket to support said shaft, a numeral wheel accumulator including a geared drive therefor, a rotatable actuator unit having settable teeth operatively associated with the geared drive and driven by said shaft, a differential unit supported on said shaft adjacent the actuator unit and including a shell having an internal gear freely supported therein, said shell having a toothed peripheral portion, a planetary pinion supported by the shell and meshing with the internal gear, a planetary pinion carried by the shaft supporting bracket and meshing with the internal gear, an actuator tooth setting sun gear meshing with the first named planetary pinion and freely rotatable about the shaft axis, a cam associated with said settable teeth and connected with the sun gear, a toothed setting lever meshing with the toothed portion of the shell to effect adjustment of said shell, whereby the sun gear and cam may be rotated and a desired number of teeth may be placed in an accumulator actuating position, and a second sun gear fixed to the shaft and meshing with the second named planetary pinion, whereby, during a cycle of operation of said shaft the differential geared unit will effect control of the drive of the first named sun gear to provide the same relative speed of rotation as that of the cyclical drive.

BERTHOLD KNAUER.

REFERENCES CITED

The following references are of record in the file of this patent:

UNITED STATES PATENTS

| Number | Name | Date |
| --- | --- | --- |
| 2,482,935 | Rast | Sept. 27, 1949 |